United States Patent Office 2,939,889
Patented June 7, 1960

2,939,889

PROCESS FOR THE PREPARATION OF STYRENE FROM N-PROPYLBENZENE

James L. Amos, Midland, Frederick J. Soderquist, Essexville, and Harold D. Boyce, Coleman, Mich., assignors to The Dow Chemical Company, Midland, Mich., a corporation of Delaware No Drawing. Filed May 25, 1956, Ser. No. 587,220

4 Claims. (Cl. 260—669)

This invention concerns the preparation of styrene from n-propylbenzene. More particularly, it concerns the preparation of styrene from n-propylbenezene by pyrolyzing the latter in the presence of a demethanation catalyst.

Ostromislensky (U.S. Patent No. 1,552,875) and Dreisbach (U.S. Patent No. 2,110,830) have shown that styrene and styrene derivatives can be produced from isopropylbenzene and its homologs by high-temperature pyrolysis in the presence of various diluents.

In accordance with this invention, it has now been discovered that it is possible to shift the pyrolytic reaction in the case of n-propylbenzene to primarily a demethanation reaction by the use of a demethanation catalyst, whereby styrene is produced. Accordingly, the process of this invention comprises passing n-propylbenzene, advantageously in admixture with a diluent gas such as steam, nitrogen, carbon dioxide, relatively unreactive hydrocarbons such as methane, vaporized benzene, etc. over a demethanating catalyst at a reaction temperature between 500° and 800° C., preferably between 600° and 750° C., cooling the reactor effluent to condense liquid product and fractionating said product, preferably under vacuum, to obtain the desired styrene.

The n-propylbenzene to be employed in the process can be obtained from any source, such as that obtained in reforming and hydroforming processes employed in petroleum refining.

It has been found that the preparation of styrene by the above method is specific to n-propylbenzene. Isopropylbenzene with the same catalyst and under the same reaction conditions produces mainly alpha-methylstyrene.

Demethanating catalysts which are advantageously used include (1) the well-known Kearby dehydrogenating catalysts described in U.S. Patents 2,370,797; 2,395,875; 2,395,876; 2,418,888; and 2,426,829; having a major proportion of ferric oxide, zinc oxide, magnesium oxide or mixtures thereof; (2) chromic oxide; (3) activated charcoal.

The demethanation reaction can be carried out with n-propylbenzene alone or in admixture with an inert diluent. The proportion by weight of diluent to feed stock may be varied, advantageously from about 0.5 to 10 parts of diluent per part of feed stock, and preferably from about 1 to 3 parts of diluent per part of feed stock.

A space velocity between 50 and 500, preferably between 200 and 300 grams, of n-propylbenzene per liter of catalyst per hour is advantageously used.

The reaction can be carried out at atmospheric, sub-atmospheric or super-atmospheric pressure as desired. Sub-atmospheric pressure favors the demethanation reaction.

In the preferred practice, n-propylbenzene feed stock, together with diluent, is passed through a reactor maintained at a reaction temperature between 500° and 800° C., preferably between 600° and 750° C., at a space velocity between 50 and 500. The reactor effluent is then cooled, liquid product is condensed, water is removed when steam diluent has been used, and the product is then fractionated to give the desired styrene.

The following examples illustrate preferred embodiments of this invention, parts and percentages therein being by weight.

EXAMPLE 1

A quantity of 20 parts per hour of a feed stock consisting of 90 percent n-propylbenzene, 4 percent ethyltoluene, the balance being aliphatics, together with water at a rate of 38.8 parts per hour, was metered to a chrome steel reactor tube maintained vertically in a two-section electric furnace. The top section of the reactor tube was packed with ¼ inch Berl ceramic saddles maintained at 370° to 390° C. The bottom section was packed with a Kearby $Fe_2O_3$—ZnO catalyst. The temperature of the lower section was 650° C. at the start of the run and was gradually increased to 700° C. The reaction products were cooled and condensed, and the steam condensate separated from the desired product. The run was terminated after 96 hours. A total of 1308 parts of liquid hydrocarbons was recovered, compared with a feed of 1914 parts n-propylbenzene. After drying and filtering, the product was fractionally distilled. The product consisted of the following components as determined by infra-red spectrometry:

| | Percent |
|---|---|
| Benzene | 3.8 |
| Toluene | 7.5 |
| Styrene | 40.1 |
| Ethylbenzene | 2.0 |
| n-Propylbenzene | 36.1 |
| Beta-methylstyrene | 2.1 |
| Indene | 0.6 |
| Undetermined | 7.8 |

EXAMPLE 2

In each of a series of runs, as summarized in the following table, a feed stock comprising n-propylbenzene, as defined in the table, was demethanated by procedures similar to that described in Example 1, employing a demethanating catalyst as stated in the table.

Table

| Run No. | Feed Stock | Catalyst | Temp., °C. | Steam/Hydrocarbon | Percent Styrene in Product | Percent Yield Styrene |
|---|---|---|---|---|---|---|
| 1 | 75% n-propylbenzene, 25% aliphatics | Kearby $Fe_2O_3$—ZnO | 700 | 3:1 | 36.2 | 62.0 |
| 2 | Same | $Fe_2O_3$—$Cr_2O_3$ | 700 | 3:1 | 25.0 | 32.4 |
| 3 | Same | Kearby MgO | 700 | 3:1 | 28.8 | 37.6 |
| 4 | Same | $Cr_2O_3$ | 700 | 3:1 | 10.8 | 26.4 |
| 5 | Same | Charcoal | 700 | 3:1 | 8.2 | 20.2 |

What is claimed is:

1. A method which consists in passing vapors of n-propylbenzene through a reaction zone in contact with a demethanating catalyst of the group consisting of $Fe_2O_3$, ZnO and MgO dehydrogenation catalysts and mixtures thereof, $Cr_2O_3$, and charcoal, wherein they are heated at reaction temperatures between 500° and 800° C. at a space velocity between 50 and 500 grams of n-propylbenzene per liter of catalyst per hour, whereby demethanation of the propyl group predominates to the substantial exclusion of dehydrogenation to give styrene, cooling the effluent vapors to condense aromatic hydrocarbons therefrom and fractionally distilling the mixture of aromatic hydrocarbons to separate styrene.

2. A method as claimed in claim 1 wherein the vapors which are fed to the reaction zone are a vapor mixture of one part by weight of n-propylbenzene and between 0.5 and 10 parts of an inert diluent, and the vapor mixture is heated at reaction temperatures between 600° and 750° C. during flow through said zone.

3. A method which consists in passing vapors of n-propylbenzene through a reaction zone in contact with a demethanating catalyst of the group consisting of $Fe_2O_3$, ZnO and MgO dehydrogenation catalysts and mixtures thereof, $Cr_2O_3$, and charcoal, wherein they are heated at reaction temperatures between 500° and 800° C. at a space velocity between 200 and 300 grams of n-propylbenzene per liter of catalyst per hour whereby demethanation of the propyl group predominates to the substantial exclusion of dehydrogenation to give styrene, cooling the effluent vapors to condense aromatic hydrocarbons therefrom and fractionally distilling the mixture of aromatic hydrocarbons to separate styrene.

4. A method as claimed in claim 3 wherein the vapors which are fed to the reaction zone are a vapor mixture of one part by weight of n-propylbenzene and between 0.5 and 10 parts of steam and the vapor mixture is heated at reaction temperatures between 600° and 750° C. during flow through said zone.

References Cited in the file of this patent

UNITED STATES PATENTS

| | | |
|---|---|---|
| 1,986,241 | Wulff et al. | Jan. 1, 1935 |
| 2,441,095 | Cheney et al. | May 4, 1948 |
| 2,857,440 | Amos et al. | Oct. 21, 1958 |